United States Patent [19]

Michaels

[11] Patent Number: 4,796,682

[45] Date of Patent: Jan. 10, 1989

[54] GROOVING APPARATUS

[76] Inventor: John Michaels, 7454 Shawnee Rd., N. Tonawanda, N.Y. 14120-1368

[21] Appl. No.: 116,369

[22] Filed: Nov. 2, 1987

[51] Int. Cl.$^4$ ............................................. B27M 1/00
[52] U.S. Cl. ................................ 144/371; 144/136 R; 144/137; 269/315
[58] Field of Search ........... 144/136 R, 136 C, 136 G, 144/137, 134 R, 371; 269/315, 319

[56] References Cited

U.S. PATENT DOCUMENTS

| | | | |
|---|---|---|---|
| 2,591,002 | 4/1952 | Pedron | 144/136 R |
| 3,595,287 | 7/1971 | Indermark . | |
| 3,770,031 | 11/1973 | Olson | 144/136 R |
| 3,827,326 | 8/1974 | Martin | 144/136 R |
| 3,827,468 | 8/1974 | Markham . | |
| 4,132,254 | 1/1979 | Shockovsky . | |
| 4,215,731 | 8/1980 | Maynard | 144/136 C |
| 4,434,824 | 3/1984 | Bussey . | |
| 4,630,656 | 12/1986 | Collins | 144/136 C |

*Primary Examiner*—W. Donald Bray
*Attorney, Agent, or Firm*—Christel, Bean & Linihan

[57] ABSTRACT

A cutting apparatus for forming a V-sectioned groove in a workpiece includes a support surface, a pair of guide rails mounted in parallel relationship with one another and in relatively low relationship with the support surface and a platform mounted upon the guide rails for movement relative to and along the length of the rails. The apparatus further includes a cutter carried by the platform for movement therewith relative to and along the length of the guide rails and including a tipped rotatable cutting tool. The cutter is supported by the platform so that the rotational axis of the cutting tool is oriented generally perpendicular to the support surface and so that the tip thereof is placed relatively close to the support surface. The cutter is adapted to form a V-sectioned groove in a workpiece positioned upon the support surface as the cutting tool is rotated and moved in cutting engagement with the workpiece and as the cutter and platform are moved relative to and along the guide rails. When the apparatus is used to form a groove in a workpiece of the type having a relatively rigid substrate and a cladding of flexible material layered upon one side of the workpiece opposite the groove-side thereof, the flexible material remains intact after the groove is formed and accommodates a folding of the workpiece about the formed groove so that the corner formed by the fold appears unbroken. The apparatus also includes a fence system and hold-down devices which facilitate mass production of grooved workpieces of like construction.

5 Claims, 2 Drawing Sheets

GROOVING APPARATUS

BACKGROUND OF THE INVENTION

This invention relates generally to cutting apparatus and relates more particularly to such apparatus for grooving a workpiece as a cutting tool is rotated and moved in cutting engagement with the workpiece.

The type of cutting apparatus with which this invention is concerned includes a support table for supporting a workpiece to be worked upon, a pair of parallel guide rails mounted across and generally parallel to the support table, a carriage movably carried by the guide rails and a cutter head supported by the carriage for movement therewith relative to and along the length of the guide rails. The cutter head includes a rotatable cutter bit and is supported by the carriage so that the rotational axis of the bit is oriented generally perpendicular to the support surface. During formation of a cut in the workpiece with the cutter bit, the workpiece is maintained in a stationary relationship upon the support surface and the bit is moved in cutting relationship with the workpiece as the carriage is moved along the guide rails. An example of such an apparatus is shown and described in U.S. Pat. No. 4,215,731.

It is an object of the present invention to provide a new and improved cutting apparatus of the aforedescribed type facilitating miter folding of a workpiece of the type having an outer surface which is defined by flexible material.

Another object of the present invention is to provide such an apparatus for accurately forming a V-sectioned groove in a workpiece of the aforedescribed type.

Still another object of the present invention is to provide such an apparatus including a fence system and associated clamping apparatus facilitating the locating of V-sectioned grooves to be formed across the workpiece.

Yet still another object of the present invention is to provide such an apparatus which is stable and effective in operation.

A further object of the present invention is to provide such an apparatus which is uncomplicated in structure and economical to construct.

SUMMARY OF THE INVENTION

This invention resides in a cutting apparatus for forming a V-sectioned groove in a workpiece in a manner facilitating a miter fold of the workpiece about the formed groove.

The cutting apparatus comprises means defining a support surface upon which a workpiece is positioned for working thereon, a pair of guide rails mounted in parallel relationship with one another and in relatively low relationship with the support surface and platform means mounted upon the guide rails for movement relative to and along the length of the rails. The apparatus further includes a cutter carried by the platform means for movement therewith relative to and along the length of the guide rails and including a tipped rotatable cutting tool. The cutter is supported by the platform means so that the rotational axis of the cutting tool is oriented generally perpendicular to the support surface and so that the tip thereof is spaced relatively close to the support surface. The cutter adapted to form a V-sectioned groove in a workpiece positioned upon the support surface as the cutting tool is rotated and moved in cutting engagement with the workpiece and as the cutter and platform means are moved relative to and along the guide rails. Upon formulation of a V-groove in a workpiece so that the V-groove extends from one side edge of the workpiece to the opposite side edge thereof, a relatively thin portion of the workpiece is left uncut between the apex of the formed V-groove and the side of the workpiece opposite the V-groove.

The apparatus is particularly well suited for forming a V-sectioned groove in a workpiece having an outer surface defined by a flexible material. By positioning the workpiece upon the support surface so that the outer surface thereof faces the support surface and cutting a V-sectioned groove in the workpiece from one side edge of the workpiece to the opposite side edge thereof, at least a relatively thin portion of the flexible material is left uncut between the apex of the formed V-sectioned groove and the outer surface of the workpiece. The workpiece can then be miter folded about the formed groove, and the uncut portion of the flexible material provides the corner of the resultant miter fold with an unbroken appearance.

BRIEF DESCRIPTION OF THE DRAWING FIGURES

DETAILED DESCRIPTION OF THE ILLUSTRATED EMBODIMENTS

Figure 1:
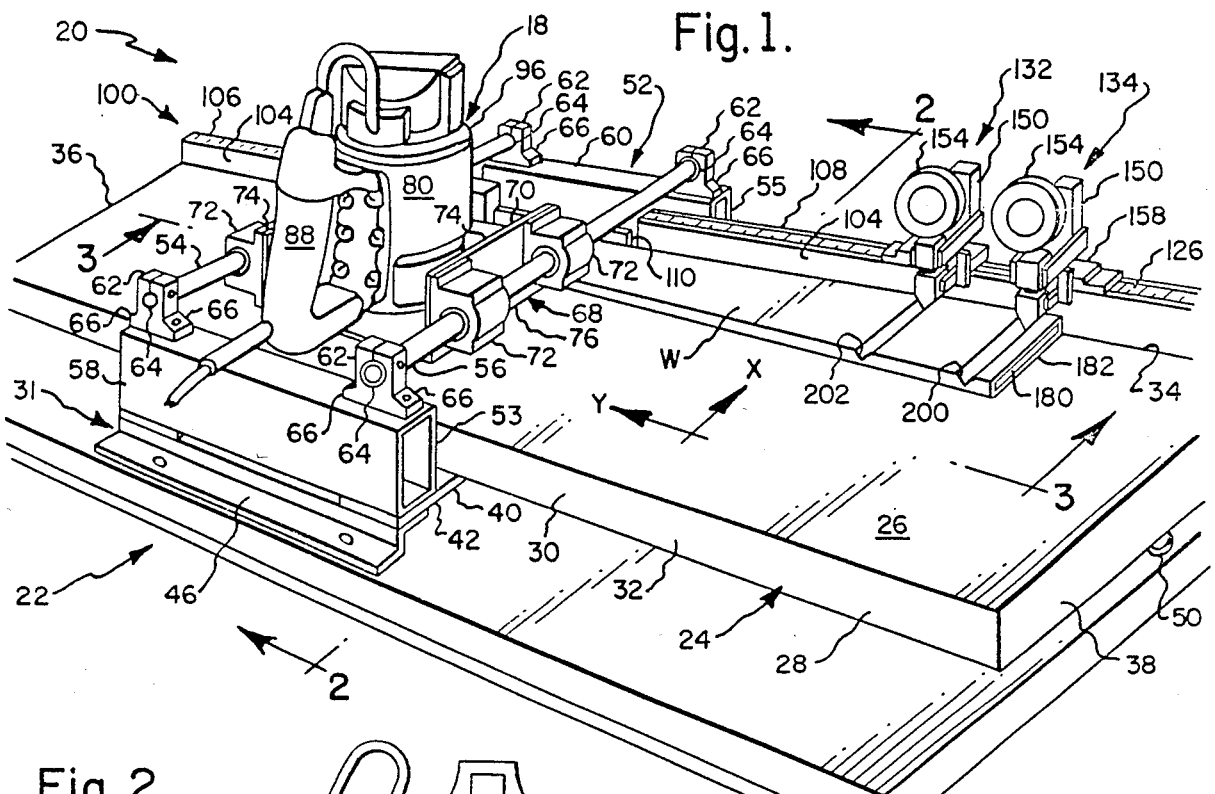
FIG. 1 is a perspective view of a grooving apparatus in accordance with the present invention.
Figure 2:
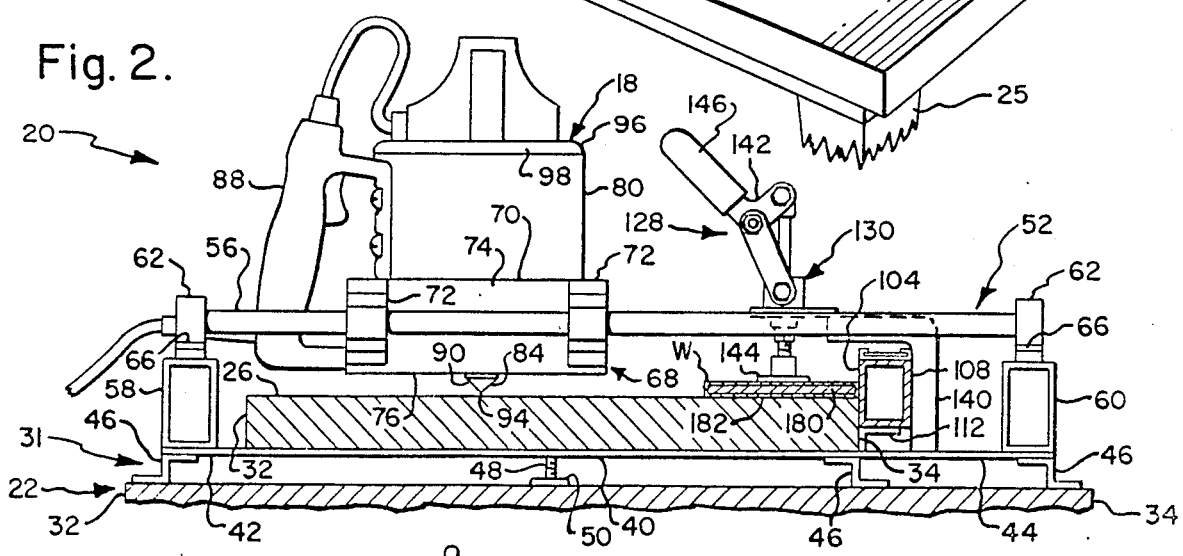
FIG. 2 is a cross-sectional view of the FIG. 1 apparatus taken about on line 2—2 of FIG. 1.
Figure 3:
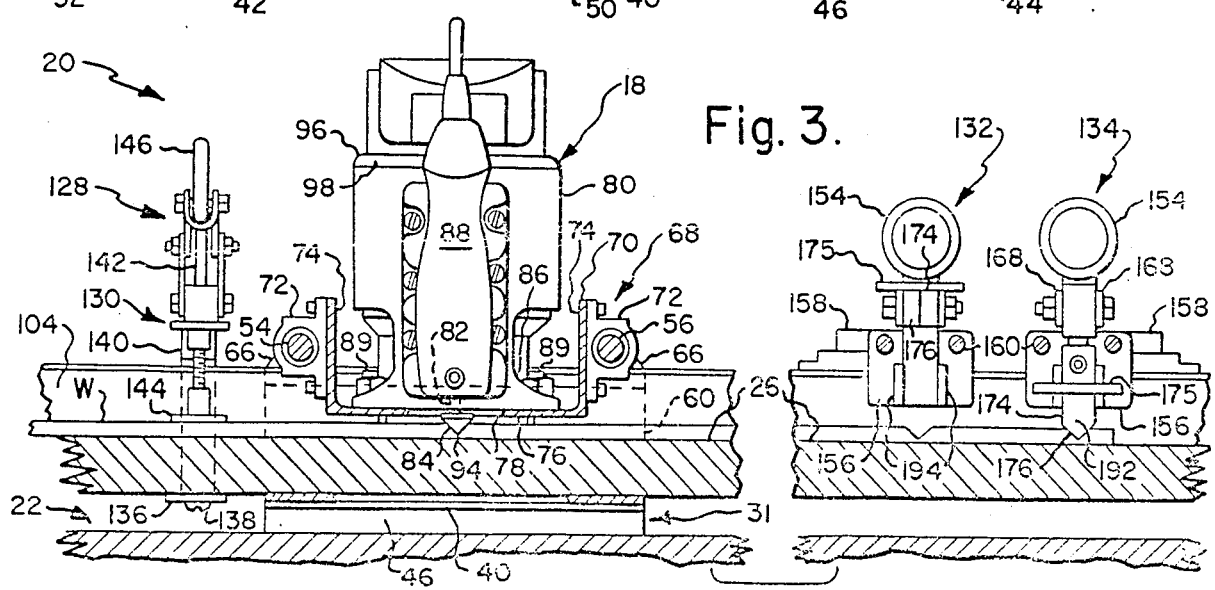
FIG. 3 is a fragmentary cross-sectional view of the FIG. 1 apparatus taken about on lines 3—3 of FIG. 1.

Turning now to the drawings in greater detail and considering first FIGS. 1-3, there is illustrated a grooving apparatus, generally indicated 20, in accordance with the present invention shown operatively positioned upon a table 22 for forming a V-groove in a workpiece W. The routing apparatus 20 includes means, generally indicated 24, defining a support surface 26 upon which the workpiece W is positioned for working thereon and a cutter 18 including a cutting tool mounted for movement across the support surface 26 in the illustrated X-coordinate direction. In operation, the workpiece W is held in a stationary condition atop and relative to the support surface 26 and the cutter 18 is moved across the support surface 26 so that its cutting tool 84 (FIGS. 3 and 4) effects a V-sectioned groove in the workpiece W from one side of the workpiece W to the other side thereof, which V-sectioned groove facilitates the miter folding of the workpiece W about the V-formed groove.

The table 22 upon which the apparatus 20 is operatively positioned includes a tabletop 23 and a plurality of legs 25 (only one shown in FIG. 1) attached beneath the tabletop 23. The tabletop 23 defines an upper planar surface which is supported by the legs 25 in a horizontal orientation and at about waist level above an underlying floor. The apparatus 20 positioned upon the upper surface of the tabletop 23 is thereby supported at a level facilitating operation of the apparatus 20 by a user.

With reference still to FIGS. 1 and 2, the support surface-defining means 24 includes a measuring table 28 including a rigid planar portion 30 and a base 31 for supporting the planar portion 30 upon the tabletop 23. The planar portion 30 is generally rectangular in shape as viewed in plan and defines two opposite side edges 32,34, two opposite ends 36,38 and opposite planar top and bottom surfaces. The support surface 26 is provided by the top surface of the planar portion 30. The planar portion 30 is constructed of wood and a laminate material spread across so as to overlie the wood and so as to render the support surface 26 relatively smooth. The relative smoothness of the surface 26 permits the workpiece W to be shifted thereacross with relative ease as the workpiece W slidably engages the support surface 26.

Figure 5:
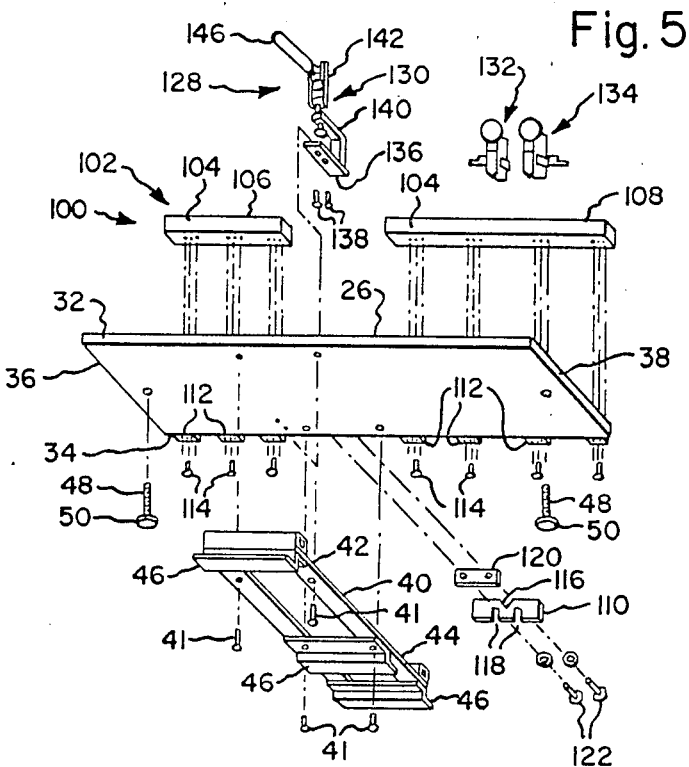
FIG. 5 is a perspective view of the measuring table and fencing system of the FIG. 1 apparatus, shown exploded.

With reference to FIGS. 1, 2 and 5, the support surface-defining means 24 further includes an elongated bracket arrangement 40 attached with screws 41 beneath the planar portion 30 so as to extend from one side 32 of the planar portion 30 to the other side 34. The bracket arrangement 40 defines two relatively broad opposite ends 42,44 which are positioned generally outboard of the sides 32,34 of the planar portion 30, as best shown in FIG. 2. Furthermore, a plurality of Z-channel plates 46 which provide a part of the base 31 of the support means 24 are attached with screws 41 beneath the bracket arrangement 40. The remainder of the base 31 is provided by a pair of adjustable leg levelers 48 threadably received by internally-threaded apertures defined in the bottom surface of the planar portion 30 and positioned adjacent each end 36 and 38 thereof. The planar portion 30 can thereby be leveled by its ends 36 and 38 by appropriately rotating the leg levelers 48 relative to the planar portion 30 to adjust the distance at which the feet, indicated 50, of each leveler 48 is spaced from the bottom surface of the planar portion 30 at its corresponding table end 36 or 38.

With reference again to FIGS. 1 and 2, the apparatus 20 further includes means, generally indicated 52, for guidably supporting the cutter 18 as the cutter 18 is moved relative to and across the support surface 26. To this end, the guide means 52 includes a pair of elongated, cylindrically-surfaced guide rails 54,56 mounted in spaced and parallel relationship with one another and to the support surface 26. For supporting the guide rails 54,56 as aforesaid, the guide means 52 includes a pair of mounting members 53,55 in the form of elongated end blocks 58,60 and four pillow blocks 62. Each mounting member 53 or 55 is affixed atop a corresponding end 42 or 46 of the bracket arrangement 40 and arranged generally parallel to one another and to the planar portion sides 32,34. Each pillow block 62 includes a central through-aperture 64 within which a corresponding end of each guide rail 54 or 56 is fixedly received and a pair of generally outwardly-directed and apertured flanges 66 positioned on opposite sides thereof. Each pillow block 62 is fixedly secured to an upwardly-facing edge of a corresponding end block 58 or 60 by means of screws having shanks which extend through the apertures in the pillow block flanges 66 and which are threadably embedded in the end block 58 or 60.

As best shown in FIG. 2, the mounting members 53 and 55 support the guide rails 54,56 so that the rails 54,56 are spaced relatively far apart and in a relatively low relationship with the support surface 26. In the apparatus embodiment 20, the rails 54 and 56 are spaced from the support surface 26 a distance within the range of about 2.5 inches to 3.0 inches (64 to 72 cm) and are spaced about 9.0 inches (230 cm) apart. It is believed that such an arrangement of the rails 54,56 enhances to the stability and rigidity of the cutter 18 as it is guided along the raisl 54,56.

With reference again to FIGS. 1-3, the apparatus 20 further includes platform means, generally indicated 68, mounted upon the guide rails 54 and 56 for movement relative to and along the length thereof. As best shown in FIG. 1, the platform means 68 includes a cutter bracket 70 and two sets of pillow blocks 72 affixed to the cutter bracket 70. As viewed in FIG. 3, the cutter bracket 70 is somewhat U-shaped in cross section so as to define a pair of parallel upstanding side arm portions 74 and a planar platform portion 76 extending between the side arm portions 74. Each pillow block 72 includes a central body portion having opening therethrough within which a corresponding guide rail 54 or 56 is slidably received and a pair of opposite flanges by which the block 76 is affixed to the cutter bracket 70. More specifically, each set of pillow blocks 72 is fixedly attached with screws to a corresponding arm portion 74 of the cutter bracket 70.

Each guide rail 54 or 56 is constructed of steel and defines a smooth polished surface, and each cutter bracket 70 and body of the pillow block 72 is constructed of a suitable material, such as steel. The through-opening of each pillow block 72, however, is lined with a material having relatively low coefficient of friction, such as nylon, for bearingly engaging the surface of the corresponding guide rail 54 or 56 received by the through-opening of a pillow block 72. The platform 68 can thereby be moved with relative ease along the guide rails 54,56 as the pillow blocks 72 are slidably moved along the surface of the rails 54,56.

As best shown in FIG. 2, the platform portion 76 of the cutter bracket 70 is supported by the bracket arm portions 74 so as to be arranged generally parallel to the support surface 26 and in a relatively low spaced relationship therewith. In the apparatus embodiment 20, the platform portion 76 is spaced from the support surface 26 a distance of about 1.0 inches (2.5 cm). Furthermore, the platform portion 76 defines a vertically-arranged through-opening 78 positioned substantially centrally therein for a purpose hereinafter apparent.

With reference again to FIGS. 1-3, the cutter 18 of the apparatus 20 is carried by the platform means 68 for movement therewith as the platform means 68 is moved relative to and along the length of the rails 54,56. The cutter 18 includes a motor housed within a casing 80 and a rotatable shaft 82 associated with the motor and having an end which depends downwardly from the motor. The downwardly-depending end of the shaft 82 is adapted to be attached to a cutting tool 84 hereinafter described. The cutter 18 further includes a rigid skirt portion 86 attached adjacent the lower end of the motor casing 80 and a handle 88 permitting the cutter 18 to be manually moved along the rails 54,56.

As best shown in FIG. 2, the cutter 18 is positioned atop the platform portion 76 of the cutter bracket 70 so that the skirt portion 84 rests in engagement with the platform portion 76. In such an arrangement, the axis of the motor shaft 82 is oriented generally perpendicular to the support surface 26. The cutter 18 is secured in a stationary relationship with the platform portion 76 by means of bolts 89 having shanks which extend through both of the skirt portion 84 and the platform portion 76. An example of a cutter 18 which is well-suited for use in the apparatus 20 is available from the Robert Bosch Power Tool Corporation and available under the trade designation Bosch 1600 Router.

Figure 4:
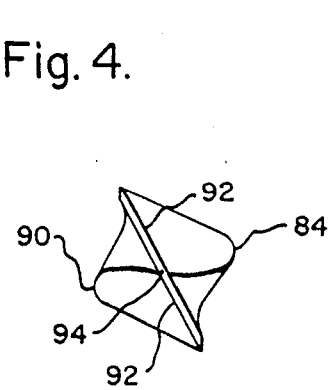
FIG. 4 is a plan view of the cutting tool of the FIG. 1 apparatus as seen from beneath the tool as illustrated in FIG. 2.

With reference to FIGS. 3 and 4, the cutting tool 84, introduced earlier and which is operatively attached to the motor shaft 82 is in the form of a V-grooving router bit 90 including a body defining cutting edges 92 adapted to form a V-groove in a workpiece when operatively guided in cutting engagement therewith wherein the walls of the formed V-groove are about ninety degrees in relationship to one another. Furthermore, the router bit 90 is non-conventional in that its tip, indicated 94, has been sharpened to a point. The bit 90 is supported by the motor shaft 82 so that its tip 94 is spaced relatively to close to the support surface 26. There is provided, however, within the apparatus 20 means, indicated 96, for adjusting the distance between the tip 94 of the cutting tool 84 and the support surface 26. In the apparatus 20, the adjusting means 96 is included within the cutter 18 and include an annular adjustment ring 98 mounted about the motor casing 80 for rotational movement relative thereto and associated mechanical mechanisms mounted within the motor casing 80. The adjustment ring 98 and the associated mechanical mechanisms are appropriately connected to one another and to the motor shaft 82 so that rotational movement of the adjustment ring 98 in one rotational direction or another about the casing 80 raises or lowers the shaft 82, and hence the tip 94, relative to the support surface 26 by a corresponding amount.

With reference to FIGS. 1-3 and 5, the apparatus 22 further includes a fence system 100 against which an edge of the workpiece W is operatively positioned when the bottom of the workpiece W is operatively positioned upon the support surface 26. The fence system 100 includes stop means 102 extending along the side edge 34 of the measuring table 28 and defines a planar abuttment surface 104 positioned so as to form a right angle with the support surface 26 and to extend generally upwardly therefrom. In the apparatus embodiment 20, the stop means 102 includes a pair of elongated blocks 106,108 having a generally rectangular cross section and a relatively rigid platen member 110 positioned intermediate of the blocks 106,108.

With reference to FIG. 5, each of the elongated blocks 106,108 is fixed to the measuring table 28 by means of L-shaped brackets 112 which each have one leg which is attached to a side edge 34 of the planar portion 30 and another leg which is attached to the bottom of a corresponding block 106 or 108 by means of screws 114. The platen member 110 is somewhat rectangular in shape and defines a V-shaped cutout 116 along one side edge thereof and a pair of parallel slots 118 along the side edge of the member 110 opposite the member side edge in which the cutout 116 is defined. A relatively thin spacer 120 is positioned between the platen member 110 and the side edge 34, and attachment of the platen member 110 to the measuring table 28 is effected by a pair of screws 122 having shanks which extend through the slots 118 in the member 110 and openings in the spacer 120 and are threadably embedded within the side edge 34 of the planar portion 30.

The platen member 110 is arranged in such a relationship to the guide means 52 of the apparatus 20 that the V-shaped cutout 116 accommodates the passage of the cutting tool 84 therethrough when the cutter 18 is moved along the guide rails 54,56 so as to approach the elongated end block 60 of the guide means 52. Further, the platen member 110 is positioned along the side edge 34 so that the apex or center of the cutout 116 is substantially centered with the path of the cutting tool tip 94 as the cutter 18 is guided along the rails 54,56. Furthermore, the slots 118 permit the height of the upper edge of the platen member 110 to be adjusted relative to the support surface 26 by loosening the screws 122 and shifting the member 110 relative to the side edge 34 of the measuring table 28 as the slots 118 are guided along the shanks of the screws 122.

As shown in FIG. 1, the apparatus 20 further includes measuring scales 124,126 which each extend along the top surface of the corresponding elongated block 106 or 108. Each measuring scale 124 or 126 is fixedly attached, as with glue, to each block 106 or 108 and provides means by which measurements along the workpiece W can be easily made. Each scale 124 or 126 is calibrated, for example, in inches and is zeroed along the side edge 34 from the center of the V-shaped cutout 116 of the platen member 110.

With reference to FIGS. 2 and 5, the apparatus 20 further includes holding means 128 for holding the workpiece W in a stationary relationship with the support surface 26. In the apparatus 20, the holding means 128 includes a clamp 130 and two V-stop securement devices 132,134 described herein. The clamp 130 includes a base 136 secured to the planar portion 30 of the measuring table 28 by means of screws 138 and a L-shaped arm portion 140 attached to the base 136 and a lever mechanism 142 attached to the arm portion 140. A presser foot 144 is threadably received by the lever mechanism 142 so as to depend downwardly therefrom, and the lever mechanism 142 includes a lever 1446 pivotally attached to the arm portion 140. The clamp 130 is an over-center type so that when the lever 124 is pivoted relative to the arm portion 140 from a condition at which the lever 124 is oriented generally perpendicular to the support surface 26 to another condition at which the lever 146 is oriented generally parallel to the support surface 26, the presser foot 144 pressingly engages the workpiece W and is maintained in engagement therewith by the lever mechanism 142. It follows that when pressed between the presser foot 144 and the support surface 26, the workpiece W is secured in a stationary relationship to the support surface 26. On the other hand, once the clamp 130 is released so that the presser foot 144 is moved to an elevated position above the workpiece W by means of the lever 146, the clamp 30 no longer prevents the workpiece W from being slidably moved across the support surface 26. By rotating the presser foot 144 relative to the lever mechanism 142 so that the distance between the foot 144 and support surface 26 can be adjusted, the clamp 130 can thereby be adjusted to accommodate and hold workpieces having different widths.

Figure 6:
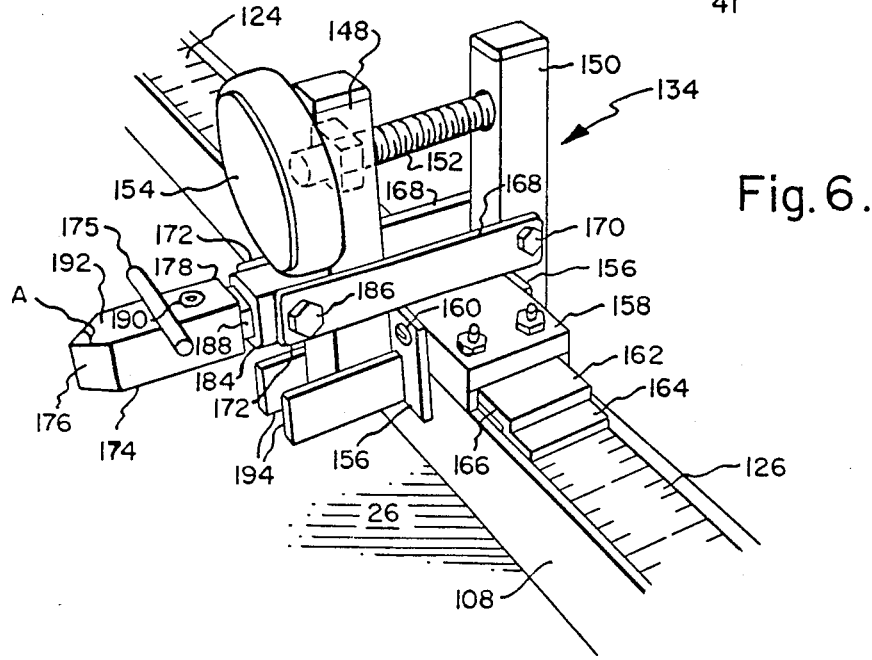
FIG. 6 is a perspective view of a V-stop securement device of the FIG. 1 apparatus.

As exemplified by the V-stop securement device 134 illustrated in FIG. 6, each securement 132 or device 134 includes a pair of parallel and generally vertically-oriented clamping bars 148,150 operatively connected by means of an externally-threaded rod 152. A knob 154 is attached at one end of the rod 152 permitting a user to manually rotate the rod 152 relative to the clamping bars 148,150. The clamping bars 148,150 are adapted to cooperate with the rod 152 so that rotation of the knob 154 in one rotational direction or another relative to the clamping bars 148,150 moves the lower ends of the bars 148,150 toward or away from one another. Each securement device 132 or 134 can thereby be releasably clamped to or detached from an elongated block 106 or 108 by positioning the lower ends of the bars 148,150 on opposite sides of an elongated block 106 or 108 and rotating the knob 154 in an appropriate rotational direction. Each device 132 or 134 includes a pad member 156 attached to the inside surface of each clamping bar 148 or 150 and adjacent the lower end thereof so that when each device 132 or 134 is in a clamped relationship with a block 106 or 108, the pad members 156 are pressed tightly by the bars 148,150 against the opposite sides of the block 108 to enhance the securement between the lamp 132 or 134 and the block 108 and thereby preventing relative movement therebetween.

Attached between the lower ends of the clamping bars 148,150 of each securement device 132 or 134 is a platen-like base member 158. Each base member 158 is fixed to one of the pad members 156 with screws 160 (only one shown in FIG. 6) and is arranged so as to extend to one side of the remainder of the device 132 or 134. Attached to the extending end of each base member 158 is piece 166 of transparent material, such as plastic, having squared-off, stepped portions 162,164. The base member 158 is adapted to slidably move along the scale 126 located atop the block 108 as the position of the corresponding device 132 or 134 is adjusted along the length of the block 108. The ends of the stepped portions 162, 164 provide indicator lines facilitating the measuring or positioning of the workpiece W along the fence system 100 for forming grooves in the workpiece W.

Each securement device 132 or 134 further includes a pair of transverse members 168 attached to and on opposite sides of the clamping bars 148,150 by means of a bolt 170. One end, indicated 172, of each transverse member 168 protrudes to one side of the clamping member 148 so that the member ends 172 define a space therebetween. Each securement device 132 or 134 further includes a V-head 174 in the form of an elongated body of substantially rectangular cross section and a V-shaped end 176. The interior angle, indicated A in FIG. 6, of the V-shaped end 176 when viewed frontally is about ninety degrees. The end, indicated 178, of the V-head 174 opposite the end 176 defines a substantially square recess extending axially therealong for a purpose described herein. A bar-like tab 175 is fixedly attached to the front surface, indicated 192, of the V-head 174 for a purpose hereinafter described. Furthermore, each V-head 174 is constructed of a suitably rigid material, such as steel.

Each V-head 174 is attached to the transverse members 168 of its corresponding securement device 132 or 134 by means of an attachment body 184. More specifically, the attachment body 184 is positioned between the transverse member ends 172 and pivotally attached thereto by means of a bolt 186 having a shank which extends through aligned openings in both the member ends 172 and body 184. A shank portion 188 having a square cross section is integrally joined to the body 184 so as to extend from one end thereof, as shown in FIG. 6, and the shank portion 188 is received by the substantially square recess defined in the end 178 of the V-head 174. An allen head screw 190 is threaded within an opening defined in the front surface 192 of the V-head 174 for engaging the shank portion 188 and thereby securing the V-head 174 in a desired location along the length of the shank portion 188. It follows that by loosening the allen head screw 190, the V-head 174 can be shifted along the length of the shank portion 188 to adjust the location of the V-head 174 relative to the shank portion 188.

It follows from the foregoing that the V-head 174 is pivotally movable relative to the transverse members 168 of its corresponding securement device 132,143 about the bolt 186. More specifically, the V-head 174 is pivotally movable from a forwardly-extending condition as illustrated in FIG. 6 at which the workpiece W can be passed between the V-head 174 and the support surface 26 and a downwardly-extending condition as shown in FIG. 1 at which the V-shaped end 176 is received by a V-sectioned groove formed in the workpiece W to enhance the securement of the workpiece W to the support surface 26 at a desired location along the length of the fence system 100. The bar-like tab 175 permits the V-head 174 to be manually pivoted between the FIG. 1 and FIG. 6 conditions with relative ease. For purposes of stabilizing the V-head 174 when positioned in the FIG. 1 condition, a pair of side stop members 194 are attached to the clamping bar 148 adjacent the lower end thereof. A gap is defined between the stop members 194 for receiving the V-head 194 when pivoted from the FIG. 6 condition to the FIG. 1 condition so that the V-head 174 is prevented from shifting from side to side relative to the bar 148 at the V-shaped end 176 by the stop members 194.

With reference again to FIG. 2, the workpiece W is in the form of an elongated platen member or boards having a rectangular cross section. The workpiece W includes a core of particle board material and a relatively thin covering or cladding 182 of flexible vinyl. Boards of this type are commonly referred to as vinyl-clad boards and have been found to be particularly useful in the construction of drawers for dressers, desks and the like. With the apparatus 20 of this invention, V-sectioned grooves can be formed in the workpiece W to a depth equal to about the thickness of the workpiece W, as measured along a perpendicular path from the support surface 26, minus the thickness of the vinyl cladding 182 coating one side of the workpiece W, so that the workpiece W can be miter folded about the formed grooves to form right angle corners for the drawers as the sections of the workpiece W positioned on opposite sides of the groove are hinged about the vinyl cladding 182 in a manner described hereinafter.

When setting up the apparatus 20 for use, the tip 94 of the cutting tool 84 should be adjusted so that the tip 94 is spaced from the support surface 26 a distance which is about equal to the thickness of the vinyl cladding 182 of the workpiece W. In the workpiece W, the vinyl cladding 182 is about 0.003 inches (0.008 cm) thick. Inasmuch as thickness of a common piece of notebook paper is about equal to 0.003 inches (0.008 cm), a piece of such paper can be used as a matter of convenience to appropriately gauge or adjust the tip-to-support surface distance as aforesaid.

To ensure a consistent cutting depth of the cutting tool 84 from one side of the workpiece W to the other side thereof, the cutting tool 84 must travel parallel to the measuring table 28 from one side edge 32 to the other side edge 34. Therefore, the distance between the tip 94 of the cutting tool 84 and the support surface 26 must be constant as the cutter 18 is moved relative to and along the guide rails 54,56. To test for constancy of cutting depth, the cutter 18 should be slowly pushed along the rails 54,56 while the user checks for a change in the tip-to-support surface distance. If such a change occurs, appropriate shimming of a mounting member 53 or 55 is required.

The platent member 110 of the fencing system 100 must also be adjusted so that the platform portion 76 of the cutter bracket 70 passes over as close as possible to the upper edge of the platen member 110. As mentioned earlier, the spacing between the upper edge of the platen member 110 and the support surface 26 can be adjusted by loosening screws 122 and shifting the platen member 110 up or down relative to the table side edge 34 as the slots 118 in the platen member 110 are guided along the shanks of the screws 122.

If the apparatus 20 is to be utilized for forming a plurality of grooves across the workpiece W as is described for the purpose of forming a drawer box, the V-head 174 of each of the securement devices 132 or 134 must be adjusted so that the V-head is snuggly receivable by a V-sectioned groove formed in the workpiece W. To this end, the allen head screw 190 in each V-head 174 is loosened and the V-head 174 is moved relative to the shank portion 188 to adjust the distance between the end 176 of the V-head 176 and the support surface 26 when the V-head 176 is oriented in the FIG. 1 condition. More specifically, the V-head 176 is adjusted relative to the support surface 26 so that its end 176 is about equal to the thickness of the vinyl cladding 182 of the workpiece W.

To utilize the apparatus 20 for forming a drawer box requiring five V-sectioned grooves and with reference to FIGS. 1 and 2, the cutter 18 is positioned along the guide rails 54,56 adjacent the mounting member 53 to accommodate the positioning of the workpiece W upon the support surface 26 and against the stop means 102. Preferably, the workpiece W is inserted beneath the guide rails 54,56 from the left side as viewed in FIGS. 1 and 3 so that successive grooves in the workpiece W can be conveniently formed as the workpiece is viewed from right to left in FIGS. 1 and 2. The workpiece W is positioned along the fence system 100 so that the leading or right end of the workpiece W extends about one half inch (1.7 cm) to the right of the center of the V-shaped cutout 116. With the workpiece W contacting the fence system 100, the clamp 130 is then utilized to secure the workpiece W in a stationary relationship with the support surface 26. At that point, the cutter 18 is turned ON and guided along the guide rails 54,56 so that the cutting tool 84 moves in cutting engagement with the workpiece W. Once the cutting tool 84 has effected a cut in the workpiece W from one side to the other side thereof, the cutter 18 is retracted along the guide rails 54,56 and switched OFF. This first-formed cut or groove is indicated 200 in FIG. 1.

During a cutting operation of the apparatus 20, the cutting tool 84 rotates about an axis perpendicular to the support surface 26. Furthermore, the cut or kerf formed by the cutting tool 84 as it is moved in cutting engagement with the workpiece W is in the form of a groove having a substantially V-shaped cross section. More specifically, the formed groove has walls which define an interior angle of about ninety-degrees. Still further, because the tip of the cutting tool 84 is spaced a distance above the support surface 26 which is about equal to the thickness of the vinyl cladding of the workpiece W, the layer of cladding positioned against the support surface 26 is uncut by the cutting tool 84 as the cutting tool 84 effects a cut in the workpiece W.

To form the second groove in the workpiece W, the securement device 132, or left V-stop 132 as shown in FIGS. 1 and 5, is positioned along the elongated block 108 so that the top of the end 176 of the V-head 176 is spaced from the center of the V-shaped cutout 116 of the platen member a distance equal to the desired width of the drawer box. Such a distance is measued along the planar surface 204 of the fence system 100. The clamp 130 is then unclamped from the workpiece W, and the workpiece W is moved toward the right along the fence system 100 as viewed in FIGS. 1 and 3 until the first-formed groove 200 is generally aligned with the left V-stop securement device 132. At that point, the V-head 174 of the V-stop 132 is positioned firmly within the first-formed groove 200 and the clamp 130 is reclamped about the workpiece W. The steps involved in guiding the cutter 18 along the guide rails 54,56 so that the cutting tool 84 moves in engagement with the workpiece W from one side thereof to the other are then repeated to form a second workpiece groove, indicated 202 in FIG. 1.

Figure 7:
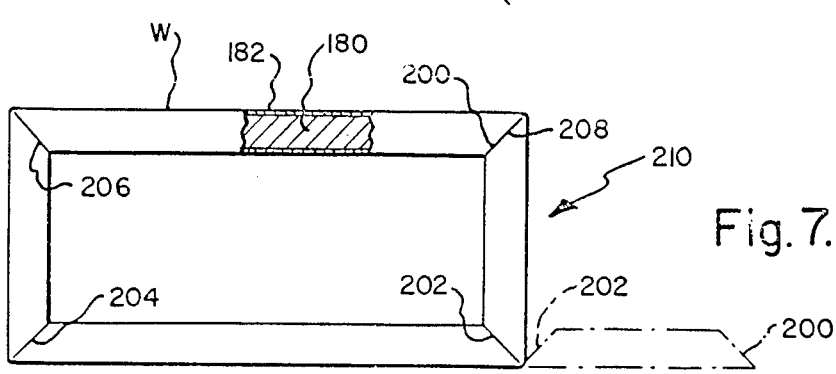
FIG. 7 is a view of the workpiece of FIG. 1 after being finished and miter folded about the grooves formed therein.

The right V-stop securement device 134 is then adjusted in position along the elongated block 108 so that the distance between the V-heads 174 of the securement devices 132,134 corresponds with the length of the drawer box. The workpiece W is then unclamped and shifted rightwardly as viewed in FIG. 1 and 3 so that the second-formed groove 202 is aligned with the center of the right securement device 134. The V-head 134 of the securement device 134 is then locked into the second-formed groove 202, the workpiece W is clamped with the clamp 130 and the third groove is formed by guiding the cutting tool 84 into cutting engagement across the workpiece W. The third-formed groove is indicated 204 in FIG. 7, although the groove 204 is shown in FIG. 7 in a closed condition once the workpiece W has been appropriately miter folded.

Having formed the third groove 204 in the workpiece W, the workpiece W is unclamped and shifted to the right as shown in FIGS. 1 and 3 until the third-formed groove aligns with the center of the left V-stop securement device 132. The V-head 174 of the device 32 is then secured into place within the third groove 204, and the workpiece W is then reclamped with the clamp 130. The fourth groove, indicated 206 in FIG. 7, is then formed by guiding the cutting tool 84 into cutting engagement with and across the workpiece W. Having formed the fourth groove 206, the workpiece W is unclampled and shifted to the right so that the fourth groove 206 is aligned with the center of the right V-stop securement device 134. The V-head 174 of the device 134 is then locked within the fourth groove 206 and the workpiece W is then reclamped with the clamp 130. The fifth and final groove, indicated 208 in FIG. 7, is then formed by guiding the cutting tool 84 into cutting engagement with and across the workpiece W.

The workpiece W is then unclamped from the apparatus 20 and cut along the first and fifth-formed grooves 200 and 208 to remove the portion of the workpiece W positioned to the right side of the first groove 200 as viewed in FIG. 3 and the portion of the workpiece W positioned to the left side of the fifth groove 208 as viewed in FIG. 3. The workpiece W can then be folded about the formed grooves 202, 204 and 206 as illustrated in FIG. 7 to bring together the remaining walls of the first and fifth grooves 200 and 208 and to form the desired drawer box, indicated 210. The abutting walls of the grooves 200 and 208 can be appropriately secured with staples or glue. A drawer bottom (not shown) can be formed for securement to the workpiece W either before or after the drawer box is formed.

It will be understood that each of the four sections of the workpiece W positioned between the adjacent grooves 200, 202, 204, 206 and 208 are joined to one another by the uncut vinyl cladding located at the bottom of each V-sectioned groove. Therefore, when folding the portions of the workpiece W relative to one another to form the box 210 illustrated in FIG. 7, each of the workpiece sections pivots relative to its adjacent section about the V-groove formed therebetween while the uncut vinyl cladding flexes or folds at the apex of the corresponding groove to accommodate the workpiece folding. Because the opposing walls of each groove forms a right angle as measured from the apex of the groove, the folding of the workpiece sections to form the FIG. 7 box 210 arranges each workpiece section at a right angle to its adjacent section.

While the aforedescribed instructions set forth above for forming a drawer box can be readily formed with the apparatus 20 for drawers having a width longer than 9 inches (23 cm) and a length longer than 12 inches (30 cm), alternative instructions may be necessary for forming a smaller drawer box having a length or width dimension which is less than 9 inches (23 cm). For example, once the first formed groove has been formed in the workpiece W, the left securement device 132 is set for a length dimension along the elongated block 108 a distance equal to the total of the length and width of the desired box. The workpiece is then shifted rightwardly so that the first-formed groove 174 is aligned with the left securement device 132, and the V-head 174 of the device 132 is then locked into the first-formed groove. The clamp 130 is then clamped about the workpiece, and the second groove is formed therein.

The right securement device 134 is then set to the right of the left securement device 132 so that the distance between the V-heads thereof is equal to the desired width of the drawer. The workpiece is then unclamped and shifted relative to the support surface 26 to the right so that the first-formed groove is aligned with the right securement device 134. At that point, the securement device 134 is locked to the first-formed groove, the clamp 130 is reclamped about the workpiece W and a third groove is formed with the cutter 18.

The workpiece W is then unclamped and shifted so that the third groove is aligned with the left securement device 132. The securement device 132 is then locked within the third-formed groove, and the clamp 130 is reclamped about the workpiece. At that point, the fourth groove is formed with the cutter 18. Once the fourth groove is formed, the workpiece is unclamped and shifted so that the fourth groove aligns with the right securement device 134. The securement device 134 is then locked within the third-formed groove and the clamp 130 is resecured about the workpiece. At that point, the fifth and final cut is formed with the cutter 18. Finishing procedures for the smaller drawer box are the same as those set forth in connection with those set forth above in connection with the drawer box having width and length dimensions greater than 9 inches by 12 inches (23 cm × 30 cm).

It follows from the foregoing that V-sectioned grooves can be formed in a workpiece with the apparatus 20 in a manner facilitating miter folding of the workpiece about the formed grooves. Furthermore, the fence system 100 and holding means 128 including the V-stop securement devices 132,134 provide means by which a plurality of grooves can be formed in a workpiece relatively quickly thereby facilitating mass production of grooved workpieces of the like construction.

It will be understood that numerous modifications and substitutions can be had to the aforedescribed embodiments without departing from the spirit of the invention. Accordingly, the aforedescribed embodiment 20 is intended for the purpose of illustration and not as limitation.

I claim:

1. A cutting apparatus comprising:
    a support having an upper horizontally disposed planar surface;
    a fence mounted upon the support to one side of the planar surface;
    a pair of guide rails interconnected with said support and disposed above the planar surface in parallel relationship thereto and with each other, the guide rails extending in a direction perpendicular to said fence;
    cutting means mounted upon said guide rails, the cutting means including a V-shaped cutting tool adapted to rotate about a rotational axis perpendicular to said planar surface whereby the cutting means can traverse a workpiece supported by said planar surface to cut a V-shaped groove therein;
    clamping means mounted on said support and capable of clamping a workpiece to said planar surface; and
    first stop means mounted upon said fence, the first stop means including a vertically shiftable V-shaped projection movable from a raised position wherein it is disposed above the workpiece to a lowered position wherein it may engage a V-shaped groove previously cut in the workpiece.

2. The cutting apparatus as set forth in claim 1 further characterized by the provision of second stop means mounted upon said fence, the second stop means including a vertically shiftable V-shaped projection movable from a raised position wherein it is disposed above the workpiece to a lowered position wherein it may engage a V-shaped groove previously cut in the workpiece.

3. The cutting apparatus as set forth in claim 2 wherein said fence is provided with indicia, and said first and second top means are adjustably mounted on said fence for movement along said fence to various positions of adjustment.

4. A method for forming a blank for a mitre corner square box drawer formed of a workpiece having an outer surface defined by a flexible material, said method comprising the following steps:
    (a) providing a planar support having an upper horizontally disposed planar surface, a fence along one side of said surface, means to clamp a workpiece upon said surface, means to cut a V-shaped groove across a workpiece in a direction perpendicular to the fence and parallel to the planar surface, and first stop means provided with a V-shaped stop capable of engaging a previously cut V-shaped groove;
    (b) positioning a workpiece on the planar surface with the flexible material adjacent said surface and with one side of the workpiece in engagement with said fence;
    (c) clamping said workpiece in said position;

(d) cutting a single V-shaped groove across said workpiece and to a depth wherein the only remaining material is the flexible material adjacent said planar support;
(e) unclamping the workpiece;
(f) repositioning the workpiece with the first V-shaped groove being engaged by the V-shaped stop said first stop means;
(g) repeating steps c, d and e to form a second V-shaped groove;
(h) repositioning the workpiece with the second V-shaped groove being engaged by the V-shaped stop of the first stop means;
(i) repeating steps c, d an e to form a third V-shaped groove in the workpiece;
(j) repositioning the workpiece with the third V-shaped groove being engaged by the V-shaped stop of said first stop means;
(k) repeating steps c, d and e to form a fourth V-shaped groove in the workpiece;
(l) repositioning the workpiece with the fourth V-shaped groove being engaged by the V-shaped stop of the first stop means; and
(m) repeating steps c, d and e to form a fifth V-shaped groove.

5. A method for forming a blank for a mitre corner rectangular box drawer formed of a workpiece having an outer surface defined by a flexible material, said method comprising the following steps:
(a) providing a planar support having an upper horizontally disposed planar surface, a fence along one side of said surface, means to clamp a workpiece upon said surface, means to cut a V-shaped groove across a workpiece in a direction perpendicular to the fence and parallel to the planar surface, and first and second stop means provided with V-shaped stops, each capable of engaging a previously cut V-shaped groove;
(b) positioning a workpiece on the planar surface with the flexible material adjacent said surface and with one side of the workpiece in engagement with said fence;
(c) clamping said workpiece in said position;
(d) cutting a single V-shaped groove across said workpiece and to a depth wherein the only remaining material is the flexible material adjacent said planar support;
(e) unclamping the workpiece;
(f) repositioning the workpiece with the first V-shaped groove being engaged by the V-shaped stop said first stop means;
(g) repeating steps c, d and e to form a second V-shaped groove;
(h) repositioning the workpiece with the first V-shaped groove being engaged by the V-shaped stop of the second stop means;
(i) repeating steps c, d an e to form a third V-shaped groove in the workpiece;
(j) repositioning the workpiece with the third V-shaped groove being engaged by the V-shaped stop of said first stop means;
(k) repeating steps c, d and e to form a fourth V-shaped groove in the workpiece;
(l) repositioning the workpiece with the third V-shaped groove being engaged by the V-shaped stop of the second stop means; and
(m) repeating steps c, d and e to form a fifth V-shaped groove.

* * * * *